G. A. THORNTON.
METHOD OF AND APPARATUS FOR BRAZING.
APPLICATION FILED NOV. 7, 1919.

1,372,634.

Patented Mar. 22, 1921.
3 SHEETS—SHEET 3.

INVENTOR
George A. Thornton
BY Arthur L. Kent
his ATTORNEY

UNITED STATES PATENT OFFICE.

GEORGE A. THORNTON, OF PORT WASHINGTON, NEW YORK, ASSIGNOR TO THORNTON TRANSFORMER COMPANY, INC., OF NEW YORK, N. Y., A CORPORATION OF NEW YORK.

METHOD OF AND APPARATUS FOR BRAZING.

1,372,634.     Specification of Letters Patent.     Patented Mar. 22, 1921.

Application filed November 7, 1919. Serial No. 336,487.

*To all whom it may concern:*

Be it known that I, GEORGE A. THORNTON, a citizen of the United States, residing at Port Washington, in the county of Nassau and State of New York, have invented certain new and useful Improvements in Methods of and Apparatus for Brazing, fully described and represented in the following specification and the accompanying drawings, forming a part of the same.

This invention relates to methods and apparatus for brazing and has for its object the providing of means for brazing articles together which shall overcome the danger of overheating and other disadvantages of the methods heretofore used for this purpose.

Prior to my invention, it was customary in brazing articles together to obtain the necessary heat from a gas or oil flame. Heating in this way has produced unsatisfactory results owing to the difficulty in controlling the heat, particularly at the points to be brazed. Overheating tends to injure the material to be brazed together, and when brazing has been applied to copper wire, for example, it has often resulted in a crystallization of the copper at the brazed joint which has made it impossible to draw the wire thereafter without breaking it.

I have devised a method by which the heating may be accurately controlled by the operator. According to my method the articles to be brazed are heated by passing an electric current through them or through a resistance adjacent to them. No flame is present and the operator is, therefore, enabled to judge the heat accurately by observing the color of the heated articles.

In order that my invention may be clearly understood, I will describe in detail the particular embodiment of my apparatus invention shown in the accompanying drawings, and a way of carrying out my method invention by the aid of this apparatus.

In the drawings:—

Figure 1:
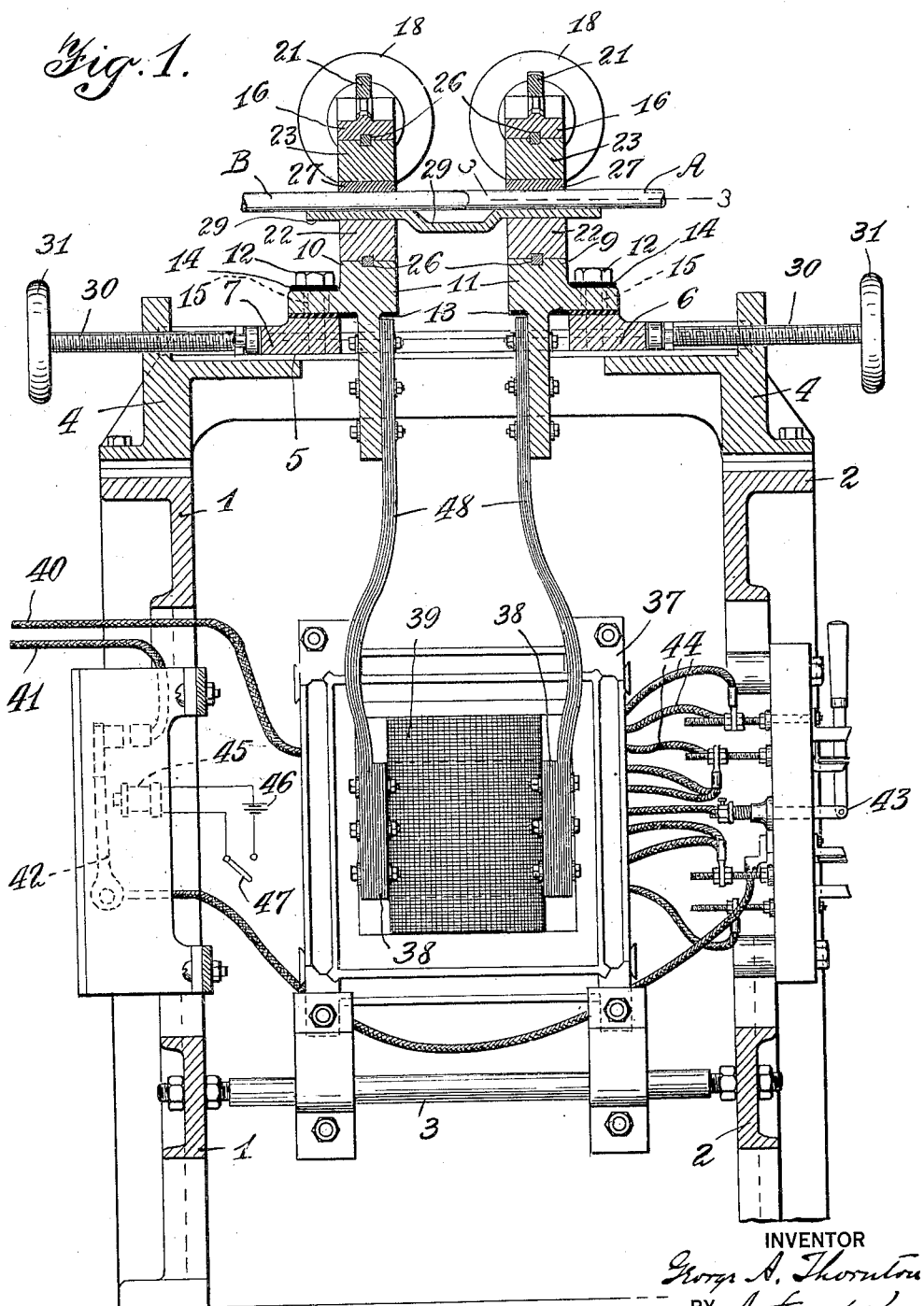
Figure 1 is a front elevation of my brazing apparatus sectioned on the line 1—1 of Fig. 3.
Figure 2:
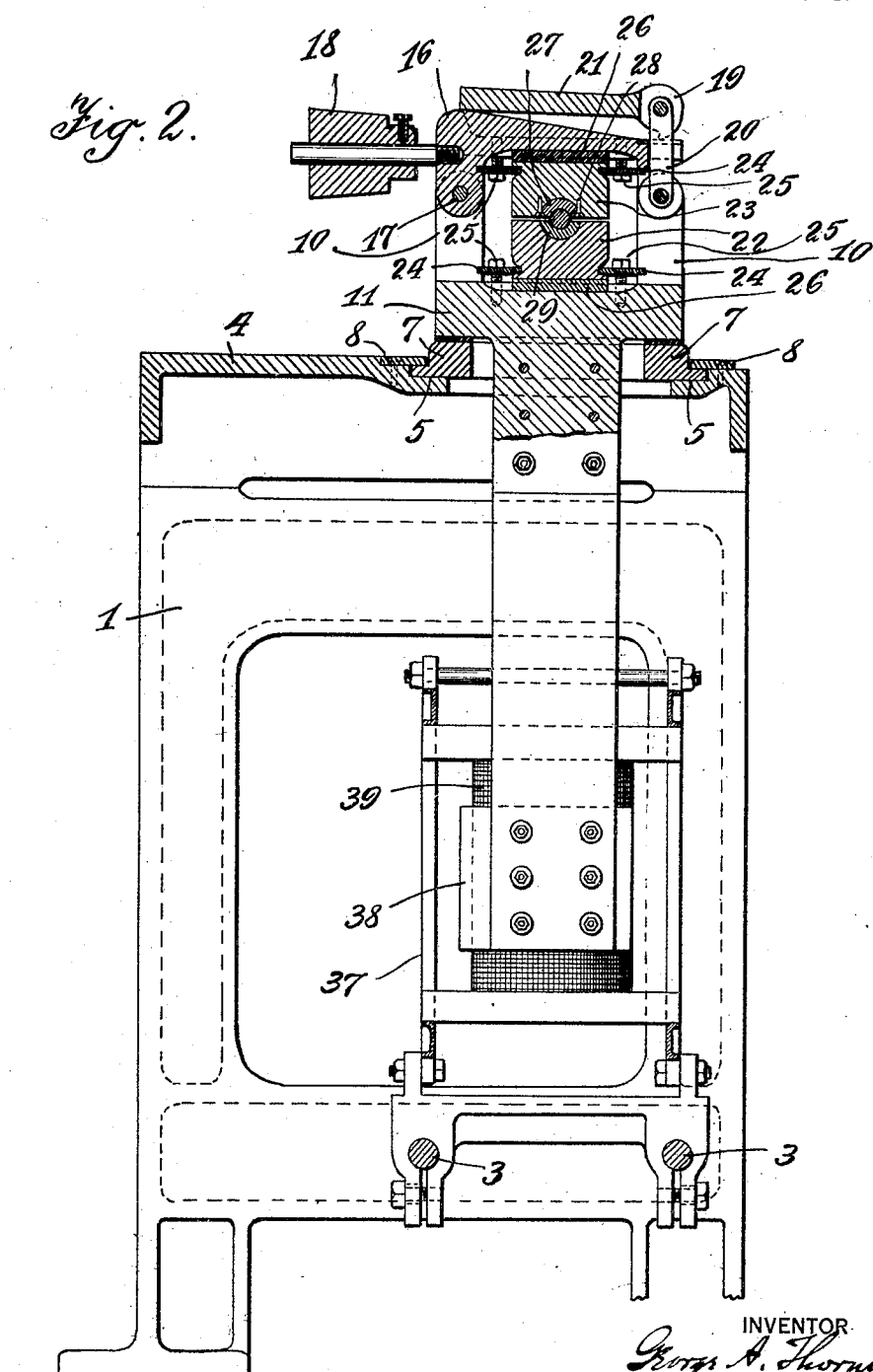
Fig. 2 is a side elevation of the apparatus sectioned on line 2—2 of Fig. 3.
Figure 3:
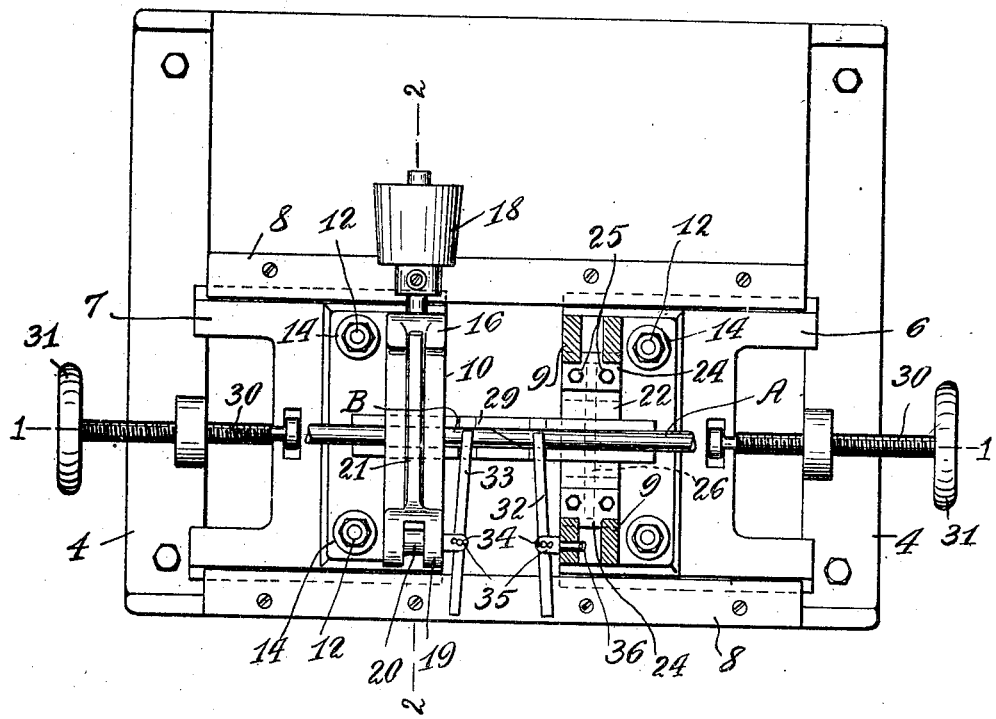
Fig. 3 is a top view of the apparatus sectioned on the line 3—3 of Fig. 1.

The apparatus shown in the drawing is supported by side frames 1, 2, braced together by rods 3. On the side frames is mounted the top frame 4 in which are formed the two tracks 5. In the tracks are the slides 6, 7, which are retained in position by strips 8 screwed to the top frame 4. Screws 30 passing through the top frame 4 and having hand wheels 31 are provided to move the slides 6, 7 in the tracks 5. On the slides 6, 7, are mounted the clamps 9, 10. Each clamp includes a lower clamp frame 11 which is fastened to one of the slides 6, 7 by means of the bolts 12. Insulating material 13 is inserted between the clamp frames 11 and the slides 6, 7, and each bolt 12 is provided with an insulating washer 14 and an insulating collar 15. To the lower clamp frames 11, the swinging frames 16 are pivoted at 17. On the swinging frames 16 are mounted the adjustable counterweights 18. To force the swinging frames 16 down upon the lower clamp frames 11, I provide cams 19 attached to the lower clamp frames 11 by links 20. The cams are provided with handles 21. Within the lower clamp frames and the swinging frames are blocks 22, 23, which are attached to the lower frames and swinging frames respectively by means of the strips 24 and the bolts 25. Keys 26 are provided to prevent lateral displacement of the blocks within the lower frames and swinging frames. In a central groove in the upper blocks 23, are dies 27 shaped on their inner surfaces to fit the articles to be brazed. The dies are attached to the blocks by screws 28. The lower blocks 22 are grooved for the reception of the shunt 29. The upper surface of the shunt is grooved to fit the articles to be brazed, except at the middle of the shunt where there is an outwardly bent portion. The shunt is of magnetic material, as, for example, steel, and is of higher electrical resistance than the articles to be brazed.

To the clamps 9, 10 are attached the low resistance shunts 32, 33. Each shunt is pivoted at 34 to a small frame 35 borne by pivot 36 passing into a hole in the lower clamp frame 11. Thus mounted, the shunts 32, 33, may be turned in all directions.

A transformer 37 is mounted on the rods 3 below the top frame 4. The terminals of the low voltage secondary coil 38 of the transformer are connected to the clamps 9, 10 by leads 48, each composed of a multiplicity of flexible flat strips of copper, or other conducting material, bolted to depending flanges on the lower clamp frames 11. The primary coils 39 of the transformer are connected to a source of alternating current by the lead 40, and the lead 41 which passes through a switch 42 held on the frame 1. The individual primary coils are connected through a multi-contact switch 43 on the frame 2 by leads 44 in order that the voltage of the secondary may be regulated by energizing any desired number of the primary coils. The switch 42 is opened by its own resiliency and is closed by a solenoid 45. The circuit for energizing the solenoid 45 is shown diagrammatically in Fig. 1. It contains a source of electricity 46 and a switch 47 which is controlled by the operator.

As an example of my method of brazing, I will describe the brazing together of two copper wires A, B, with the aid of the machine shown in the drawings. The ends of the wires to be brazed are first cut slantingly so as to provide oblique surfaces. The wires are then clamped in the machine between the dies 27 and the shunt 29 in the position shown in the drawings. To do this the cam handles 21 are raised and the cams 19 and links 20 are swung out and down below the point at which the links are pivoted to the lower clamp frames 11. When this is done, the counterweights 18, raise the swinging frames 16 and with them the upper blocks 23 and the dies 27. The wires A, B are then placed in the grooves of the shunt 29 with their ends in contact and their oblique faces vertical. The swinging frames 16 are then closed by the operator. The links 20 are swung to the position shown in the drawings, and the cam handles 21 are pushed down so that the cams 19 force the swinging frames 16 down and lock them in the position shown in the drawings. The wires A, B are then firmly held between the shunt 29 and the dies 27. The low resistance shunts 32, 33 are so placed that neither of them is in contact with the wires.

Figure 4:
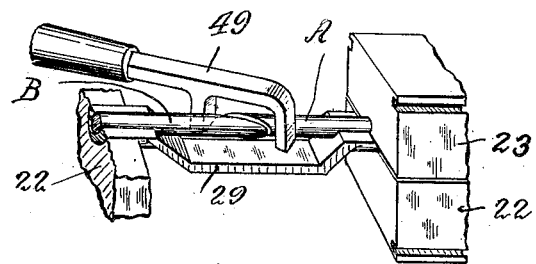
Fig. 4 is a fragmentary perspective view showing a method of separating the surfaces to be brazed for the admission of a spelter.

The switch 47 is then closed by the operator. This in turn closes the switch 42, allowing the alternating current to flow through the primary of the transformer. This produces a low voltage current in the secondary coil of the transformer which flows through the flexible leads 48 to the clamps. The circuit is completed through the wires A, B and the shunt 29. As the resistance of the wires is less than the shunt the greater part of the current flows through the wires if their oblique faces make a good electrical contact. If, however, the contact between the wires is imperfect, a greater proportion of the current flows through the shunt. In either case, portions of the wires between the clamps are heated both by the current flowing through them and by heat radiation and conduction from the shunt which is heated by the current flowing through it. While the wires are heating, a flux such as borax is placed on them at the joint, and a small amount of a spelter, such as silver, is then placed at the same point on the wires. The wires are in plain view of the operator and he observes their color as they are being heated. If because of lack of uniformity in the wires A, B, or because of imperfect contact between one of these wires and one of the clamps, one of the wires is heated more rapidly than the other, this fact is immediately observed by the operator from the difference in color of the two wires. The operator then adjusts one of the shunts 32, 33, so as to make the heating uniform. Thus if the wire B heats more rapidly than the wire A, the operator places the end of the shunt 33 attached to the clamp 10 in contact with the wire B. Owing to the low resistance of the shunt 33 most of the current which was passing through the wire B is thus diverted through the shunt 33, while the current through the wire A is not diminished. The rapidity of the heating of the wire B is thus reduced so that the heating of the two wires is made uniform. When the color of both wires becomes bright red and indicates that a proper brazing temperature has been reached, the operator opens the switch 47 which opens the switch 42 and cuts off the current. The oblique faces of the wires are then slightly separated for a moment, to permit the spelter which is by this time in molten condition to flow between the faces. This may be done by springing the ends of the wires apart by means of a fork 49, as is clearly shown in Fig. 4. When the fork is removed, the resiliency of the wires presses the oblique surfaces together while the wires are cooling and the spelter is setting. When this has occurred the braze is completed and the wires may be unclamped and removed from the machine.

The machine may be used for different sized wires or for other articles by providing different dies 27 and different shunts 29, and if necessary, different blocks 22, 23. Furthermore, the distance between the clamps may be regulated by means of the hand wheels 31. When articles of greater cross-section are to be brazed, it is desirable that the clamps be farther apart in order that a greater portion of the articles may be heated by the electric current. Placing the clamps farther apart also makes it easier to spring apart the surfaces to be brazed in case of articles of large cross-section, or articles otherwise difficult to bend.

The use of the shunt 29 has two important advantages:—It aids in the heating, particularly when the contact between the ends of the wires is imperfect. It prevents a whirling of the spelter on the surfaces to be brazed which tends to produce an imperfect joint. This whirling occurs when the shunt is not used, and is apparently caused by a magnetic field about the wires which is broken up or modified by the presence of the shunt, which is made of magnetic material.

If desired, however, the shunt 29 may be omitted altogether and replaced by dies similar to the dies 27. In this case the moving of the articles to be brazed in and out of contact may be accomplished by manipulation of the hand wheels 31.

It will be understood that many other changes may be made in the apparatus and the method without departing from my invention, which is by no means limited to the brazing of copper wires, but may be applied to articles of all sorts made of all materials which can be jointed by brazing. The spelter to be used is, of course, determined by the material of the articles to be brazed.

What is claimed is:

1. A method of brazing, consisting in bringing the surfaces to be brazed into contact with each other, passing an electric current through the articles to be brazed until the color indicates that a proper brazing temperature has been reached, cutting off the current, separating the surfaces to be brazed to allow a spelter to flow between them, bringing the surfaces together again, and holding them in contact until the spelter has hardened.

2. A method of brazing, comprising bringing in contact the surfaces to be brazed together, passing an electric current through the articles to be brazed together and through a shunt in contact with them until a proper brazing temperature has been reached, cutting off the current, separating the surfaces to allow a spelter to flow between them, bringing them together again, and holding them in contact until the spelter has hardened.

3. A method of brazing, comprising bringing the articles to be brazed into contact with a shunt, passing an electric current through said shunt until the color of the articles indicates that a proper brazing temperature has been reached, cutting off the current, introducing a flux and a spelter between the surfaces to be brazed, and pressing the surfaces into contact with each other until the spelter is hardened.

4. A method of brazing together wires, comprising cutting the wires obliquely, bringing the oblique surfaces at the ends of the wires into contact with each other, passing an electric current through a portion of each wire adjacent to said surfaces until the color of the wire indicates that a proper brazing temperature has been reached, cutting off the current, springing the wires so as to separate the oblique surfaces to allow a spelter to flow between them, bringing the surfaces into contact, and pressing them together until the spelter is set.

5. A method of brazing together wires, comprising cutting the wires obliquely, bringing the oblique surfaces at the ends of the wire into contact with each other in a vertical plane, passing an electric current through a portion of each wire adjacent to said surfaces and through a shunt in contact with the wires until a proper brazing temperature has been reached, springing the wires so as to separate the oblique surfaces to allow a spelter to flow between them, bringing the surfaces into contact, and pressing them together until the spelter is set.

6. A method of brazing, comprising bringing the surfaces to be brazed in contact with each other, passing an electric current through the articles to be brazed, maintaining the heating of the articles uniform by shunting off the current from the article which heats the more rapidly, cutting off the current when the color indicates that both articles have reached a proper brazing temperature, separating the surfaces to be brazed to allow a spelter to flow between them, bringing the surfaces together again, and holding them in contact until the spelter is hardened.

7. A method of brazing together copper wires, comprising bringing the ends of the wires into contact with each other, placing a flux and a spelter on the wires at the point of contact, passing an electric current through a portion of each wire adjacent to the point of contact and through a shunt in contact with the wires until a proper brazing temperature has been reached, separating the ends of the wires to allow the flux and spelter to flow between them, bringing the ends into contact, and pressing them together until the spelter is set.

8. A method of brazing together copper wires, comprising bringing the ends of the wires into contact with each other, placing a flux and a spelter on the wires at the point of contact, passing an electric current through a portion of each wire adjacent to the point of contact until a proper brazing temperature has been reached, separating the ends of the wires to allow the flux and the spelter to flow between them, bringing the ends into contact, and pressing them together until the spelter is set.

9. Apparatus for brazing, comprising two terminals of a low voltage electric circuit, a shunt across said terminals, and means for bringing the articles to be brazed into contact with said terminals respectively and with said shunt.

10. Apparatus for brazing, comprising two terminals of a low voltage electric circuit, a high resistance shunt of magnetic metal connecting said terminals, and means for holding the two articles to be brazed in contact with said terminals respectively and in contact with said shunt.

11. Apparatus for brazing, comprising two clamps forming the terminals of a low voltage electric circuit, a high resistance shunt extending between said clamps, and means for holding the two articles to be brazed in said clamps.

12. Apparatus for brazing wires, comprising two clamps forming the terminals of a low voltage electric circuit, a shunt of magnetic metal extending between said clamps having in its upper surface a groove for the reception of the wires to be brazed, and an outwardly bent portion at its center, and dies in said clamps having grooves to fit the wires to be brazed.

13. Apparatus for brazing, comprising two terminals of a low voltage electric circuit, means for holding the two articles to be brazed in contact with said terminals respectively and in contact with each other, an adjustable shunt connected to one of said terminals, and adapted to be placed in contact with one of the articles.

14. In apparatus for brazing, two lower clamp frames, a shunt extending between them and having a portion of its upper surface shaped to fit the articles to be brazed, an upper clamp frame, a removable die in said clamp frame shaped to fit the articles to be brazed, and means for forcing said upper and lower clamp frames together so as to hold the article to be brazed between said shunt and said die.

In testimony whereof I have hereunto set my hand in the presence of two subscribing witnesses.

GEORGE A. THORNTON.

Witnesses:
ROBERT W. BYERLY,
ANTHONY F. CASSIDY.